US010587658B2

(12) United States Patent
Dowlatkhah et al.

(10) Patent No.: US 10,587,658 B2
(45) Date of Patent: Mar. 10, 2020

(54) REAL TIME COMMUNICATION HUB FOR MULTIPLE SECURE CONNECTIONS THROUGH SHARED SESSION

(71) Applicant: AT&T Intellectual Property I, L.P., Atlanta, GA (US)

(72) Inventors: Sangar Dowlatkhah, Alpharetta, GA (US); Venson Shaw, Kirkland, WA (US); Zhi Cui, Sugar Hill, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 194 days.

(21) Appl. No.: 15/449,434

(22) Filed: Mar. 3, 2017

(65) Prior Publication Data
US 2018/0255110 A1    Sep. 6, 2018

(51) Int. Cl.
H04L 29/06 (2006.01)
H04W 8/18 (2009.01)
G06F 15/16 (2006.01)

(52) U.S. Cl.
CPC ...... *H04L 65/1069* (2013.01); *H04L 65/4069* (2013.01); *G06F 15/16* (2013.01);
(Continued)

(58) Field of Classification Search
USPC ........................................................ 709/227
See application file for complete search history.

(56) References Cited

U.S. PATENT DOCUMENTS 8,018,956 B1 *  9/2011  Deng ............... H04L 1/187
                                                  370/401
8,725,885 B1 *  5/2014  Ryner .............. G06F 21/45
                                                  709/228
(Continued)

FOREIGN PATENT DOCUMENTS

WO    WO2016116137        7/2016

OTHER PUBLICATIONS

Heikkinen, Arto, Timo Koskela, and Mika Ylianttila. "Performance evaluation of distributed data delivery on mobile devices using WebRTC." *Wireless Communications and Mobile Computing Conference (IWCMC), 2015 International.* IEEE, 2015.
(Continued)

*Primary Examiner* — James A Edwards

(57) ABSTRACT

A gateway may establish a session with an endpoint, receive, from a healthcare application of the endpoint, a setup request for establishing a real time communication tunnel with a destination, the setup request including an incoming port number, the destination associated with a medical provider, and establish a transport layer connection between the endpoint and the destination via the session. The establishing the transport layer connection may include translating the incoming port number to an outgoing port number according to a mapping and forwarding the setup request to the destination via the outgoing port number. The real time communication tunnel may be established between the endpoint and the destination via the transport layer connection, and a second real time communication tunnel between the endpoint and a second destination is established via the session. The gateway may forward a set of messages comprising medical data via the real time communication tunnel.

20 Claims, 3 Drawing Sheets

(52) U.S. Cl.
CPC .............. *H04L 29/06* (2013.01); *H04L 69/16* (2013.01); *H04W 8/18* (2013.01)

(56) References Cited

U.S. PATENT DOCUMENTS

| | | |
|---|---|---|
| 9,065,969 B2 | 6/2015 | Johnston et al. |
| 9,241,131 B2 | 1/2016 | Desai |
| 9,363,133 B2 | 6/2016 | Yoakum et al. |
| 9,525,718 B2 | 12/2016 | Johnston et al. |
| 9,531,808 B2 | 12/2016 | Singh et al. |
| 2010/0235517 A1* | 9/2010 | Augustinos ......... H04M 3/4935 709/227 |
| 2012/0054276 A1* | 3/2012 | Chaturvedi ......... H04L 67/1046 709/204 |
| 2013/0053029 A1* | 2/2013 | Anchan ................ H04W 76/12 455/432.3 |
| 2014/0108594 A1 | 4/2014 | Siegel et al. |
| 2015/0200946 A1 | 7/2015 | Horn et al. |
| 2015/0365244 A1 | 12/2015 | Schmitz |
| 2016/0285948 A1* | 9/2016 | Saint-Hilaire .......... H04L 67/02 |
| 2016/0292089 A1* | 10/2016 | Achar ................... G06F 13/102 |

OTHER PUBLICATIONS

Desmet, Lieven, and Martin Johns. "Real-time communications security on the web." *IEEE Internet Computing* 18.6 (2014): 8-10.

* cited by examiner

REAL TIME COMMUNICATION HUB FOR MULTIPLE SECURE CONNECTIONS THROUGH SHARED SESSION

The present disclosure relates generally to secure real time communications for medical and healthcare applications, and more particularly to devices, computer-readable media and methods for establishing multiple real time communication tunnels of an endpoint device via a session with a gateway device.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
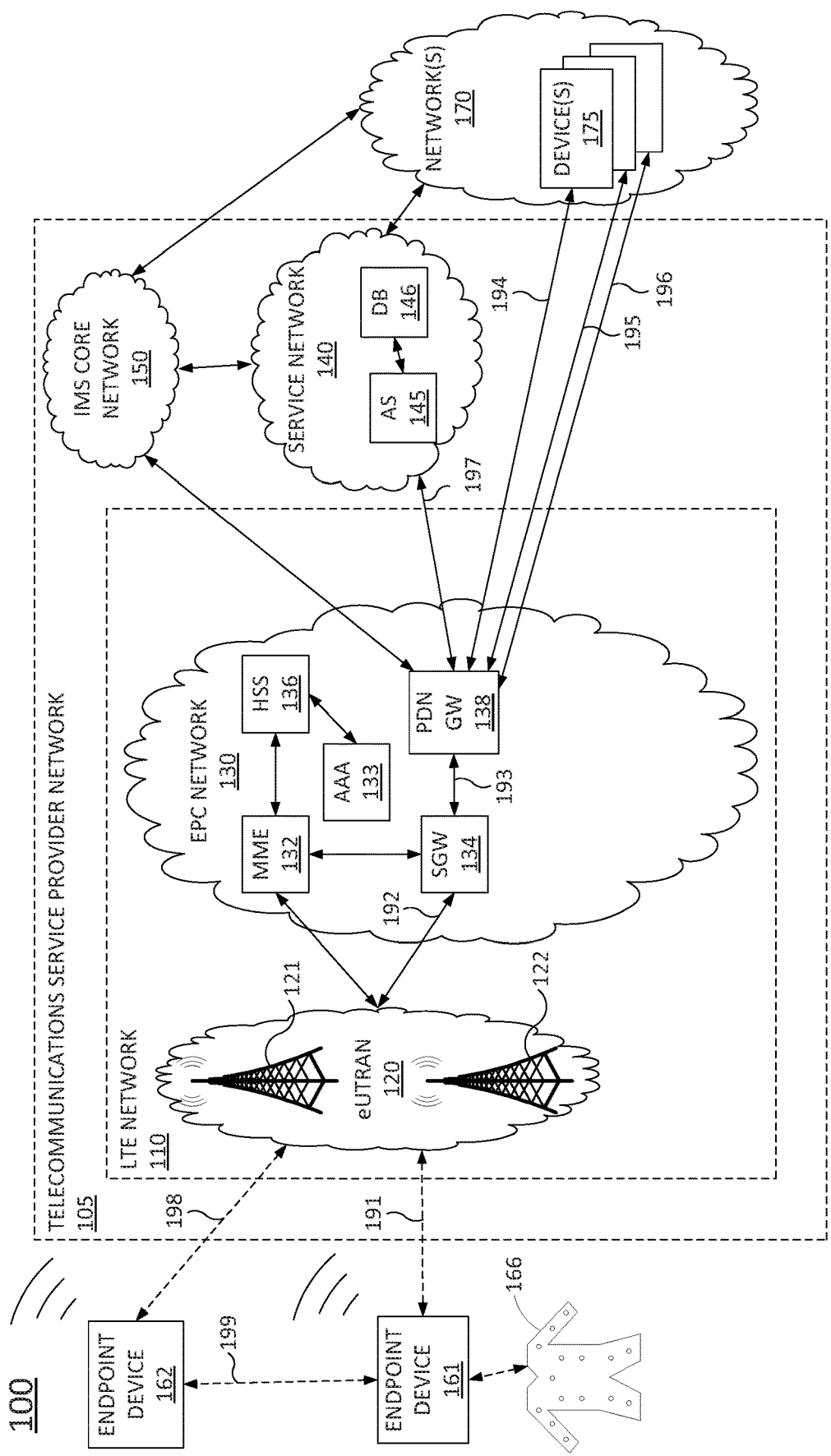
FIG. 1 illustrates an example system related to the present disclosure.

The present disclosure broadly discloses devices, computer-readable media, and methods for establishing multiple real time communication tunnels of an endpoint device via a session with a gateway device. For instance, in one example, a processor may establish a session with an endpoint device and receive, from a healthcare application of the endpoint device, a setup request for establishing a first real time communication tunnel with a first destination device. In one example, the setup request includes a first incoming port number. In addition, in one example, the first destination device is associated with a medical provider. The processor may further establish a first transport layer connection between the endpoint device and the first destination device via the session. The establishing the first transport layer connection may include translating the first incoming port number to a first outgoing port number according to a pre-assigned incoming port number-to-outgoing port number mapping and forwarding the setup request to the first destination device via the first outgoing port number. In one example, the first real time communication tunnel is established between the endpoint device and the first destination device via the first transport layer connection, and a second real time communication tunnel between the endpoint device and a second destination device is established via the session. The processor may further forward a first set of messages comprising first medical data from the endpoint device to the first destination device via the first real time communication tunnel. In one example, the forwarding includes translating the first incoming port number the first outgoing port number for the forwarding of the first set of messages.

A typical requirement for electronic medical and healthcare data is that it be kept secure from leakage and eavesdropping. In the mobile device environment, a healthcare-related application may use a secure connection that is compliant with the Health Insurance Portability and Accountability Act (HIPAA) Privacy Rule and/or Security Rule and has a one-to-one connection with a destination via a secure protocol, such as Web Real-Time Communication (WebRTC). WebRTC is a collection of technologies that allows users to send real-time communications, including voice, video, and other data to a destination from an application, e.g., a web browser or mobile application, without the use of plug-ins or third-party software. WebRTC is based on Hyper-Text Markup Language 5 (HTML5) and has three primary application programming interfaces (APIs): RTCPeerConnection, RTCDataChannel, and getUserMedia (or MediaStream). These three APIs are included in several widely-used web browsers as well as numerous mobile applications. The getUserMedia API allows an application to access and share media content, such as stored audio or video tracks, or to capture a stream of data from a device's camera and microphone, and to share the media content/data with a remote peer, or destination device. The RTCPeerConnection API allows an application to establish a tunnel between the endpoint device and a destination device for audio or video calling, while the RTCDataChannel API allows an application to utilize the tunnel between the endpoint device and a destination device for any type of application data (e.g., non-audio and/or non-video data).

In one example, the present disclosure includes a WebRTC aggregator application (broadly a "healthcare-related application") on a mobile endpoint device that operates in the endpoint device's Trusted Execution Environment (TEE) and that serves as a point of contact for other healthcare-related applications that exist on the endpoint device. The other healthcare-related applications may include a secure text messaging application or a video conferencing application for communicating between a patient (e.g., a user of the endpoint device) and a medical provider, an application for receiving biometric data from a biometric device (or sensor) and/or for forwarding biometric data to a destination device or entity, a web browser for connecting to a healthcare-related server, and so forth. In one example, the WebRTC aggregator application can communicate with multiple destination devices on multiple WebRTC tunnels via a WebRTC hub within the telecommunication service provider network using a single session, such as a Packet Data Protocol (PDP) context or an Evolved Packet System (EPS) bearer. In one example, the WebRTC hub may comprise a gateway device, such as a gateway General Packet Radio Service (GPRS) support node (GGSN) or a packet data network (PDN) gateway (PDNGW or PGW). However, in another example, the WebRTC hub may comprise an application server connected to a GGSN or PDN gateway that may receive all WebRTC traffic for the endpoint device from the GGSN or PDN gateway. In one example, for each WebRTC tunnel from the WebRTC aggregator application on the endpoint device to a destination device or entity, the WebRTC hub assigns an incoming port to an outgoing port. From the originating application and WebRTC aggregator application point of view, the communication with the destination is happening within the single WebRTC tunnel. However, every communication stream through the WebRTC aggregator application, such as video chat or secure texting with a doctor, a pharmacist, a third-party cloud-based secure storage, etc., is happening with its own dedicated WebRTC tunnel which is tagged by the WebRTC hub in the telecommunication network.

In one example, the WebRTC hub may enable a destination device to pull in other devices into the line of communication (for example a doctor asking for second opinion with another doctor and/or to change the dosage of the medication through a video conference with a pharmacist) while keeping the communication with the patient up and running. Authorization to use this capability may be dynamically assigned within a policy enforcement function connected to the WebRTC hub. The policy may include, for example, patient preferences of who can communicate with the patient at any given time (e.g., where the patient is a user of the endpoint device). In one example, a patient's insurance company may also add certain requirements to the policy. In one example, backup endpoint devices may also be included in a WebRTC session such that when the endpoint device is communicating with a physician and/or other healthcare related entities, the backup or redundant device(s) can resume the communication with the destination device in case of any interruption with the main endpoint device. A backup endpoint device may comprise, for example, a mobile endpoint device of a relative or caregiver who may be with the user or in the vicinity of the user. In addition, in one example, biometric data may also be directed from the endpoint device to a local or network-based data storage server, where medical providers may use a push-pull capability to retrieve the information and even interact with the premises-based biometric devices. These and other aspects of the present disclosure are discussed in greater detail below in connection with the examples of FIGS. 1-3.

To better understand the present disclosure, FIG. 1 illustrates an example network, or system 100 that may implement examples of the present disclosure for establishing multiple real time communication tunnels of an endpoint device via a session with a gateway device. In one example, the system 100 includes a telecommunication service provider network 105. The telecommunication service provider network 105 may comprise a Long Term Evolution (LTE) network 110, a service network 140, and a core network, e.g., an IP Multimedia Subsystem (IMS) core network 150. The system 100 may further include other networks 170 connected to the telecommunication service provider network 105. As shown in FIG. 1, the system 100 may connect endpoint devices 161 and 162 with each other and with the application server (AS) 145 in service network 140, with devices 175 in networks 170, and/or with other components of telecommunication service provider network 105. The endpoint devices 161 and 162 may each comprise a cellular telephone, a smartphone, a tablet computing device, a laptop computer, a pair of computing glasses, a wireless enabled wristwatch, or any other wireless and/or cellular-capable mobile telephony and computing device (broadly, a "mobile endpoint device"). In one example, the endpoint devices 161 and 162 may each comprise a device of a subscriber or customer of the telecommunication service provider network 105.

As illustrated in FIG. 1, endpoint device 161 may also be in communication with one or more biometric sensors 166, which may comprise wearable units, devices connected to a body of a user of endpoint device 161, or devices which are not specifically connected to the body of the user, but which nevertheless measure physical parameters of the user (broadly "biometric data"), such as: a heart rate, a breathing rate, a blood oxygen concentration, a blood sugar level, an electrocardiogram pattern, a pupil dilation, an activity level, skin conductance and/or sweat/skin moisture levels, a temperature, an activity level, a voice pitch and tone, and so forth. The biometric sensors 166 may comprise, for example: heart rate monitors, electrocardiogram devices, acoustic sensors, sensors for measuring users' breathing rates, galvanic skin response (GSR) devices, portable electroencephalography (EEG) devices, event-related potential (ERP) measurement devices, diffuse optical tomography (DOT) scanners, and so forth. The endpoint device 161 may be in communication with biometric sensors via a wired connection, such as universal serial bus (USB) connection, a high-definition multimedia interface (HDMI) connection, a wired Ethernet connection, or the like, or via a wireless connection, such as a via an infrared transmitter or transceiver, a transceiver for IEEE 802.11 based communications (e.g., "Wi-Fi"), IEEE 802.15 based communications (e.g., "Bluetooth", "ZigBee", etc.), and so forth.

In one example, endpoint device 161 also includes one or more healthcare-related applications. The healthcare-related applications may be for a variety of functions, such as for receiving biometric data from biometric sensors 166, for storing the biometric data, and/or for sending the biometric data to remote devices in modified or unmodified form, for securely communicating via voice or video with healthcare-related entities, such as doctors, hospitals, and insurers, and so on. In one example, the endpoint device 161 also includes a healthcare-related aggregator application that operates in a Trusted Execution Environment (TEE) of the endpoint device 161 and that serves as a point of contact for the other healthcare-related applications that exist on the endpoint device 161. In addition, in one example, endpoint device 162 may be configured in a same or a similar manner as endpoint device 161. For instance, endpoint device 162 may also include a healthcare-related aggregator application and one or more other healthcare-related applications. However, in accordance with the present disclosure and as described in greater detail below, in one example, endpoint device 162 may serve as a backup device to endpoint device 161 for various real time communication tunnels.

In one example, the LTE network 110 comprises an access network and a core network. For example, as illustrated in FIG. 1, LTE network 110 may comprise an evolved Universal Terrestrial Radio Access Network (eUTRAN) 120 and an evolved packet core (EPC) network 130. The eUTRANs are the air interfaces of the 3rd Generation Partnership Project (3GPP) LTE specifications for mobile networks. In one example, EPC network 130 provides various functions that support wireless services in the LTE environment. In one example, EPC network 130 is an Internet Protocol (IP) packet core network that supports both real-time and non-real-time service delivery across a LTE network, e.g., as specified by the 3GPP standards. In one example, all eNodeBs, e.g., including eNodeB (eNB) 121 and eNodeB (eNB) 122 in the eUTRAN 120, are in communication with the EPC network 130. In operation, LTE user equipment or user endpoints (UE), such as endpoint devices 161 and 162, may access wireless services via the eNodeBs 121 and 122 located in eUTRAN 120. It should be noted that any number of eNodeBs can be deployed in an eUTRAN.

In EPC network 130, network devices Mobility Management Entity (MME) 132 and Serving Gateway (SGW) 134 support various functions as part of the LTE network 110. For example, MME 132 is the control node for the LTE access networks, e.g., including eUTRAN 120. In one embodiment, MME 132 is responsible for user equipment tracking and paging (e.g., such as retransmissions), bearer activation and deactivation process, selection of the SGW, e.g., SGW 134, and user authentication. In one embodiment, SGW 134 routes and forwards user data packets, while also acting as the mobility anchor for the user plane during inter-eNodeB handovers and as the anchor for mobility between LTE and other wireless technologies, such as 2G and 3G wireless networks.

In addition, EPC (common backbone) network 130 may comprise a Home Subscriber Server (HSS) 136 that contains subscription-related information (e.g., subscriber profiles), registration data, and network policy rules, and that performs authentication and authorization of a wireless service user. Thus, HSS 136 may store information regarding various subscriber/customer devices, such as endpoint devices 161 and 162. HSS 136 may also maintain and provide information about subscribers' locations. In one example, Authentication, Authorization, and/or Accounting (AAA) server 133 obtains subscriber profile information from HSS 136 to authenticate and authorize endpoint devices to connect to EPC network 130 via Institute for Electrical and Electronics Engineers (IEEE) 802.11 (Wi-Fi)/non-3GPP access networks.

The EPC network 130 may also comprise a packet data network (PDN) gateway 138 which serves as a gateway that provides access between the EPC network 130 and various data networks, e.g., service network 140, IMS core network 150, networks 170, and the like. The packet data network gateway 138 is also referred to as a PDN gateway, a PDN GW or a PGW. In one example, PDN gateway 138 may comprise a device, such as computing system 300 depicted in FIG. 3, specifically configured to provide one or more functions for establishing multiple real time communication tunnels of an endpoint device via a session with a gateway device, in accordance with the present disclosure. For instance, an example method 400 for establishing multiple real time communication tunnels of an endpoint device via a session with a gateway device is illustrated in FIG. 4 and described in greater detail below. As used herein, the terms "instantiate," "configure," and "reconfigure" may refer to programming or loading a computing device with computer-readable/computer-executable instructions, code, and/or programs, e.g., in a memory, which when executed by a processor of the computing device, may cause the computing device to perform various functions. In addition, such terms may comprise provisioning, allocating or assigning other resources of a computing device to a component, such as all or a portion of a memory, an attached data storage unit, and so forth. In one example, PDN gateway 138 may comprise a WebRTC hub, in accordance with the present disclosure.

In one example, service network 140 may comprise one or more devices, such as application server (AS) 145 for providing services to subscribers, customers, and or users. For example, telecommunication service provider network 105 may provide a cloud storage service, web server hosting, and other services. As such, service network 140 may represent aspects of telecommunication service provider network 105 where infrastructure for supporting such services may be deployed. In one example, AS 145 may comprise a computing system, such as computing system 300 depicted in FIG. 3, specifically configured to provide one or more service functions in accordance with the present disclosure, such as a network-based secure data storage for medical records and/or biometric data (broadly "healthcare-related data"). Although a single application server, AS 145, is illustrated in service network 140, it should be understood that service network 140 may include any number of components to support one or more services that may be provided to one or more subscribers, customers, or users by the telecommunication service provider network 105.

In one example, networks 170 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 170 may include different types of networks. In another example, the other networks 170 may be the same type of network. In one example, the other networks 170 may represent the Internet in general. Devices 175 may include servers, such as web servers, storage devices, enterprise servers, email servers, and so forth. Devices 175 may also include personal computers, desktop computers, laptop computers, personal digital assistants (PDAs), tablet computing devices, or any other devices for wireless and/or wired communications. In one example, endpoint devices 161 and 162 may communicate with devices 175 in networks 170 via PDN GW 138 and/or via PDN GW 138 and IMS core network 150, e.g., for voice over LTE (VoLTE)-based calls or Wi-Fi calling. In one example, devices 175 may comprise servers for healthcare-related applications, such as a secure database server and/or secure streaming server for storing healthcare-related data, a server for remotely monitoring biometric sensors and/or a patient associated with the biometric sensors, or a computing device of a doctor, a hospital, an insurance company, and so forth.

As mentioned above, in one example, PDN gateway 138 may provide one or more functions for establishing multiple real time communication tunnels of an endpoint device via a session with a gateway device, in accordance with the present disclosure. For instance, telecommunication service provider network 105 may provide a service whereby a subscriber's endpoint device may maintain communications with multiple destination devices via secure tunnels through a single session, e.g., an EPS bearer, for securely communicating biometric data and/or other medical information, including secure audio and/or video conferencing, healthcare application screen or browser tab sharing, and so forth, with medical service providers and other healthcare-related entities. For instance, an EPS bearer may be established for endpoint device 161 with PDN gateway 138 over links 191, 192 and 193. In one example, the establishment of the EPS bearer may include an assignment of an IP address to the endpoint device 161 for use in connection with communications with devices external to LTE network 110 and which are reachable via PDN gateway 138. In addition, in one example, PDN gateway 138 may comprise a default gateway for routing of IP packets for endpoint device 161. In one example, the EPS bearer may comprise a dedicated EPS bearer with bandwidth, delay, jitter, packet loss, and other parameters established in accordance with a quality of service (QoS) profile the WebRTC traffic to be generated by and for healthcare applications on endpoint device 161.

As referred to herein, "traffic" may comprise all or a portion of a transmission, e.g., a sequence or flow, comprising one or more packets, segments, datagrams, frames, cells, protocol data units, service data unit, bursts, and so forth. The particular terminology or types of data units involved may vary depending upon the underlying network technology. Thus, the term "traffic" is intended to refer to any quantity of data to be sent from a source to a destination through the system 100. In addition, the term "payload traffic" may refer to application layer data (e.g., according to the TCP/IP reference model) which may be encapsulated for transmission via the one or more networks with one or more headers utilized by the network interface layer, the Internet layer, etc.

It should be noted that in one example, PDN gateway 138 may be deployed in EPC network 130 to establish and support sessions specifically for establishing multiple real time communication tunnels for healthcare-related communications. In other words, a different PDN gateway may serve endpoint device 161 via a different session (e.g., a different EPS bearer) for other data services and a different IP address may be assigned to the endpoint device 161. The destination devices may comprise, for example, devices 175 in networks 170 and may include a secure database server and/or a secure streaming server, computing devices of a doctor, a hospital, or an insurance company, and so forth. The destination devices may also include AS 145 in service network 140. For example, one of the services offered by telecommunication service provider network 105 may comprise a network-based biometric data/medical information secure storage, e.g., in database (DB) 146.

In one example, endpoint device 161 may attempt to establish a first real time communication tunnel (e.g., a WebRTC tunnel) for healthcare-related communications with a first destination device (e.g., a first one of devices 175). In this regard, endpoint device 161 may send a setup request for establishing a first real time communication tunnel toward the first one of devices 175. In one example, the setup request may include a session description protocol (SDP) message, e.g., a SDP offer. In one example, the endpoint device may call RTCPeerConnection, which generates an SDP offer and sends the SDP offer via the signaling channel, e.g., via PDN gateway 138 over links 191, 192, and 193. In one example, PDN gateway 138 performs several functions to establish a secure transport layer connection in connection with the setup request.

In one example, the setup request may include a port number (an "incoming" port number) that is associated with a type of healthcare-related data to be communicated via the first real time communication tunnel. Alternatively, or in addition, the "incoming" port number may be associated with a desired recipient (the first one of devices 175) of the healthcare-related data to be communicated via the first real time communication tunnel. In one example, PDN gateway 138 may be a default gateway for IP communications of endpoint device 161 and may receive the setup request. In one example, PDN gateway 138 stores a mapping of incoming port numbers to outgoing port numbers, where outgoing port numbers are associated with different destination devices (e.g., among devices 175 and/or AS 145). Thus, incoming port numbers are paired with respective outgoing port numbers, and are also associated with different destination devices.

In one example, the associations between incoming port numbers and outgoing port numbers for real time communications of endpoint device 161 may be pre-defined by a user of endpoint device 161, by a provider or developer of the healthcare-related application, by an operator of the telecommunication service provider network 105, and so forth. In one example, the associations between incoming port numbers and outgoing port numbers may be based upon a type of content of the medical data. For instance, if the real time communication tunnel is to be established for sending heart rate monitor readings to a secure database, the endpoint device 161 may select a particular incoming port number, which is translatable by the PDN gateway 138 into an outgoing port number that is associated with the secure database. In other words, by the endpoint device 161 including the incoming port number, the PDN gateway 138 may select the appropriate outgoing port number for reaching the secure database. However, if the healthcare-related data comprises a data stream, e.g., a live video and/or audio feed of the user of endpoint device 161 communicating with a computing device of a doctor, the endpoint device 161 may select a different incoming port number, which is translatable by the PDN gateway 138 into an different outgoing port number that is associated with the computing device of the doctor. In still another example, a different incoming port number-outgoing port number pair is assigned to each destination device.

In another example, endpoint device 161 or another device associated with the user of endpoint device 161 may identify various authorized destination devices which are permitted to be connected to endpoint device 161 for communicating healthcare-related data via a real time communication tunnel. PDN gateway 138 may then configure the incoming port number to outgoing port number mappings based upon the destination devices. The port number mapping may utilize any assignment scheme. However, the endpoint device 161 may be provided with the incoming port numbers which are mapped to specific types of healthcare-related data or to a specific destination device, where the PDN gateway 138 may forward real time communication tunnel setup requests and payload data via real time communication tunnels that are established by selecting the appropriate outgoing port numbers. In one example, the incoming ports numbers and outgoing port numbers may range from 0 to 65,535 (in integer form), thereby providing more than 4 billion possible incoming ports numbers to outgoing port numbers pairs.

Continuing with the present example, PDN gateway 138 may forward the setup request to the first one of devices 175 via an outgoing port number that is associated with the incoming port number provided by the endpoint device 161. Thus, the setup request may be forwarded to the one of devices 175 via one of links 194, 195, or 196. PDN gateway 138 may also receive a response from the first one of devices 175, e.g., a SDP response. In one example, the SDP response may be received via the outgoing port number and the PDN gateway 138 may: translate the outgoing port number to the incoming port number in accordance with the incoming port number to outgoing port number mappings, modify the SDP response by substituting the outgoing port number with the incoming port number, and forwarding the SDP response that is modified to endpoint device 161. In one example, Interactive Connectivity Establishment (ICE) parameters may be specified to utilize PDN gateway 138 an intermediary for the real time communication tunnel (e.g., a Traversal Using Relays around Network Address Translation (NAT) (TURN) server). In one example, Session Traversal Utilities for NAT (STUN) parameters may specifically be omitted to guarantee that PDN gateway 138 remains in the path of the first real time communication tunnel. However, in another example, the present disclosure may ensure that the PDN gateway 138 remains in the path of the first real time communication tunnel by virtue of the fact that PDN gateway 138 anchors the session with endpoint device 161 and is the IP default gateway.

In one example, the setup request and answer/response may be followed by a Datagram Transport Layer Security (DTLS) handshake. For example, the exchange of SDP offer and answer may establish an unsecured User Datagram Protocol (UDP) connection, which may be unsuitable for transporting payload information comprising healthcare-related data. In one example, endpoint device 161 may send a DTLS ClientHello message toward the first one of devices 175. In one example, endpoint device 161 may also include the same incoming port number in the ClientHello message as was included in the real time communication tunnel setup request. In one example, the PDN gateway 138 may receive the ClientHello, translate the incoming port number to the outgoing port number, and forward the ClientHello message towards the destination device (the first one of devices 175) via the outgoing port number. In other words, the PDN gateway 138 may substitute the incoming port number for the outgoing port number in the ClientHello message before forwarding the ClientHello message to the first one of devices 175. The first one of devices 175 may send a ServerHello message via the outgoing port number, which may be translated by the PDN gateway 138 into the incoming port number for forwarding to the endpoint device 161. A similar process may be followed by PDN gateway 138 in connection with additional messages between endpoint device 161 and the one of devices 175 for certificates and key exchange, cipher selection, and so forth.

With keys exchanged via DTLS, the endpoint device 161 and the first one of devices 175 may encrypt the healthcare-related data that is desired to be communicated with the respective keys for transmission via PDN gateway 138. Thus, at this time, the real time communication tunnel (e.g., a WebRTC tunnel, which may also be referred to as a DTLS tunnel) may be considered to be established. In one example, the healthcare-related data may be sent from endpoint device 161 to the first one of devices 175 (or vice-versa) using Secure Real-time Transport Protocol (SRTP) messages (and/or using Secure Real-time Transport Control Protocol (SRTCP) for control messaging related to the delivery of payload data via SRTP), or Stream Control Transmission Protocol (SCTP) messages. For instance, SRTP and SRTCP may be used in connection with the communication of both stored/pre-recorded and live audio and video data (e.g., captured via a camera and/or a microphone integrated or attached to endpoint device 161 or the first one of devices 175), while SCTP may be used for other types of healthcare-related data, such as electronic medical records, readings from biometric sensors, and so forth. In any case, the keys exchanged via DTLS may be used to secure the messages. Thus, SRTP, SRTCP, and SCTP messages may all be multiplexed over the same DTLS tunnel. It should be noted that the PDN gateway 138 remains in the communication path and continues to perform port translation for the messages between endpoint device 161 and the first one of devices 175 via the DTLS tunnel.

In one example, endpoint device 161 may attempt to establish a second real time communication tunnel (e.g., a WebRTC tunnel, or DTLS tunnel) for healthcare-related communications with a second of the devices 175 which is to be utilized alongside and at the same time as the first real time communication tunnel with the first one of devices 175. In other words, the second real time communication tunnel is to be established using the same session as the first real time communication tunnel. The establishing of the second real time communication tunnel may comprise similar operations to that which is described above in connection with the establishing of the first real time communication tunnel, such as: PDN gateway 138 receiving from endpoint device 161 a second setup request for establishing a second real time communication tunnel (e.g., a SDP message generated via RTCPeerConnection) including a port number (an "incoming" port number) that is associated with a type of healthcare-related data to be communicated via the second real time communication tunnel or a desired recipient (the second of the devices 175) of the healthcare-related data to be communicated via the second real time communication tunnel, PDN gateway 138 forwarding the second setup request to the second of the devices 175 via an outgoing port number that is associated with the incoming port number provided by the endpoint device 161, PDN gateway 138 receiving a SDP response message from the second of the devices 175, PDN gateway 138 translating the port number of the SDP response message (e.g., the outgoing port number) to the incoming port number, and forwarding the SDP response message to the endpoint device 161. The establishing the second real time communication tunnel may also include a DTLS handshake for endpoint device 161 and the second of devices 175 to have respective keys for the second real time communication tunnel. Once the second real time communication tunnel is established, one or both of endpoint device 161 and the second of devices 175 may then exchange healthcare-related data using SRTP (and SRTCP) and/or SCTP over the second real time communication tunnel (e.g., a DTLS tunnel, which may also be referred to as a WebRTC tunnel). Notably, the second real time communication tunnel may utilize a different incoming port number—outgoing port number pair than the first real time communication tunnel. Thus, the two real time communication tunnels may share the same session. For instance, as mentioned above, PDN gateway 138 may store a mapping of incoming port numbers to outgoing port numbers, where outgoing port numbers are associated with different destination devices (e.g., among devices 175 and/or AS 145). Furthermore, additional real time communication tunnels for endpoint device 161 with other destinations may also be established via the same session in the same or in a similar manner, but using different incoming port number—outgoing port number pairs.

In one example, the present disclosure may also provide for a backup endpoint device to be associated with the session, and with any real time communication tunnels established via the session. For instance, in one example, endpoint device 162 may be registered with PDN gateway 138 as an authorized backup endpoint device for the session of endpoint device 161 with PDN gateway 138, as well as for the first real time communication tunnel with the first of devices 175, the second real time communication tunnel with the second of devices 175, and so forth. In one example, PDN gateway 138 may transfer the session to the backup endpoint device 162 when a failure condition associated with the endpoint device 161 is detected. For instance, the failure condition may comprise failure of LTE network 110 to receive a keep-alive message from endpoint device 161, an explicit message from endpoint device 161 of an imminent loss of power, a failure of a user of endpoint device 161 to provide a user input after a certain duration of time, and so forth. In one example, the transferring of the session to the backup endpoint device 162 comprises re-assigning an IP address that was assigned to endpoint device 161 for the session to endpoint device 162. It should be noted that endpoint device 162 may have one or more additional IP addresses assigned for one or more sessions of its own. For instance, endpoint device 162 may have an active session via PDN gateway 138 (e.g., via links 198, 192, and 193) and/or with another PDN gateway of EPC network 130 (not shown). For instance, endpoint device 162 may already have a session for IMS services and a session for data services. Nevertheless, endpoint device 162 may still accommodate the transfer of the session from endpoint device 161.

In one example, endpoint device 161 may provide redundancy data to endpoint device 162 to allow endpoint device 162 to maintain the first real time communication tunnel and the second real time communication tunnel. In one example, the redundancy data may be provided via a third real time communication tunnel between the endpoint device 161 and the backup endpoint device 162 via the session (e.g., via links 191, 192, and 193) to PDN gateway 138, and via links 193, 192, and 198 from PDN gateway 138 to endpoint device 162. In another example, the redundancy data may be provided via a peer-to-peer connection 199 that excludes the PDN gateway 138, such as via an IEEE 802.11 or 802.15 link, via an infrared link, and so forth. In one example, the redundancy data may include the security keys for the respective real time communication tunnels, e.g., keys obtained and/or provided by endpoint device 161 during a DLTS handshake for establishing each of the respective real time communication tunnels. The redundancy data may also include information on which port numbers to utilize in connection with different destination devices and/or different types of healthcare-related data.

In one example, the redundancy data may also include healthcare-related data that is transferred via various real time communication tunnels that are established via the session, including, for instance: readings from biometric sensors 166, audio and/or video streams from one of devices 175, audio and/or video streams from endpoint device 161 to one of devices 175, state information, and so forth. Thus, from the perspective of one of the destination devices/peers at the opposite end of a real time communication tunnel, the destination device may continue to use the same key(s) to receive healthcare-related data from the originating end, and/or to send healthcare-related data to the originating end which is seamlessly transferred to the backup endpoint device 162, may continue to use the same port number(s) to receive and send the healthcare-related data via SRTP (and SRTCP) and/or SCTP over the respective real time communication tunnel, and so forth. In addition, endpoint device 162 is assigned the IP address of the session and is provided with enough additional information to allow it to continue communications as if it were the endpoint device 161.

It should be noted that the system 100 has been simplified. In other words, the system 100 may be implemented in a different form than that which is illustrated in FIG. 1. For example, the system 100 may be expanded to include additional networks, such as network operations center (NOC) networks, additional eUTRANs, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, one or more functions of the present disclosure for establishing multiple real time communication tunnels of an endpoint device via a session with a gateway device may be deployed in AS 145 in service network 140, or in another device that is external to the EPC network 130. For instance, PDN gateway 138 may forward WebRTC communications to AS 145 in connection with a session that is established for endpoint device 161, where AS 145 may perform additional operations to establishing multiple real time communication tunnels of an endpoint device via a session with a gateway device, in accordance with the present disclosure. In addition, various elements of eUTRAN 120, EPC network 130, and IMS core network 150 may be omitted for clarity, including gateways or border elements providing connectivity between such networks, such as a home subscriber server (HSS), an authenticating, authorization and accounting (AAA) server, a security gateway (SeGW), and so forth. Similarly, due to the relatively large number of connections available between devices in the system 100, various links between various components of system 100 are also omitted for clarity.

In addition, various operations described above may be modified in accordance with the present disclosure. For instance, in another example, PDN gateway 138 may function as a DTLS proxy. In particular, PDN gateway 138 may establish a first DTLS tunnel between the endpoint device 161 and the PDN gateway 138 via the session (e.g., the EPS bearer), translate the first incoming port number to a first outgoing port number according to a pre-assigned incoming port number-to-outgoing port number mapping, and establish a second DTLS tunnel between the PDN gateway 138 and a destination device (e.g., one of devices 175 or AS 144) via the first outgoing port number. For example, the first DTLS tunnel may be over links 191, 192, and 193, while the second DTLS tunnel may be over one of links 194-196, or link 197, for example. In one example, LTE network 110 and/or telecommunication service provider network 105 may comprise a trusted certificate authority (CA), to allow PDN gateway 138 to sign certificates that are trusted by endpoint device 161. Hence, PDN gateway 138 may attempt to establish a DTLS connection with a destination device as if PDN gateway 138 was the client (e.g., endpoint device 161), while responding to the (DTLS) setup request from endpoint device 161 as if PDN gateway 138 were the server to which the DTLS setup request was directed (e.g., the destination device). It should also be noted that although links 194-196 appear to be illustrated as direct links between PDN gateway 138 and devices 175, links 194-196 may traverse any number of intermediate devices and networks, including other cellular networks, ISP networks, and so forth, and/or the Internet in general.

In addition, although aspects of the present disclosure have been discussed above in the context of a long term evolution (LTE)-based network, examples of the present disclosure are not so limited. For example, the teachings of the present disclosure can be applied to other types of cellular networks (e.g., a 2G network, a 3G network, and the like, or a future technology or standard-based network). For instance, examples of the present disclosure may implement packet data protocol (PDP) contexts for endpoint devices accessing data services through a gateway General Packet Radio Service (GPRS) support node (GGSN) instead of an EPS bearer associated with PDN GW 138. Thus, these and other modifications are all contemplated within the scope of the present disclosure.

Figure 2:
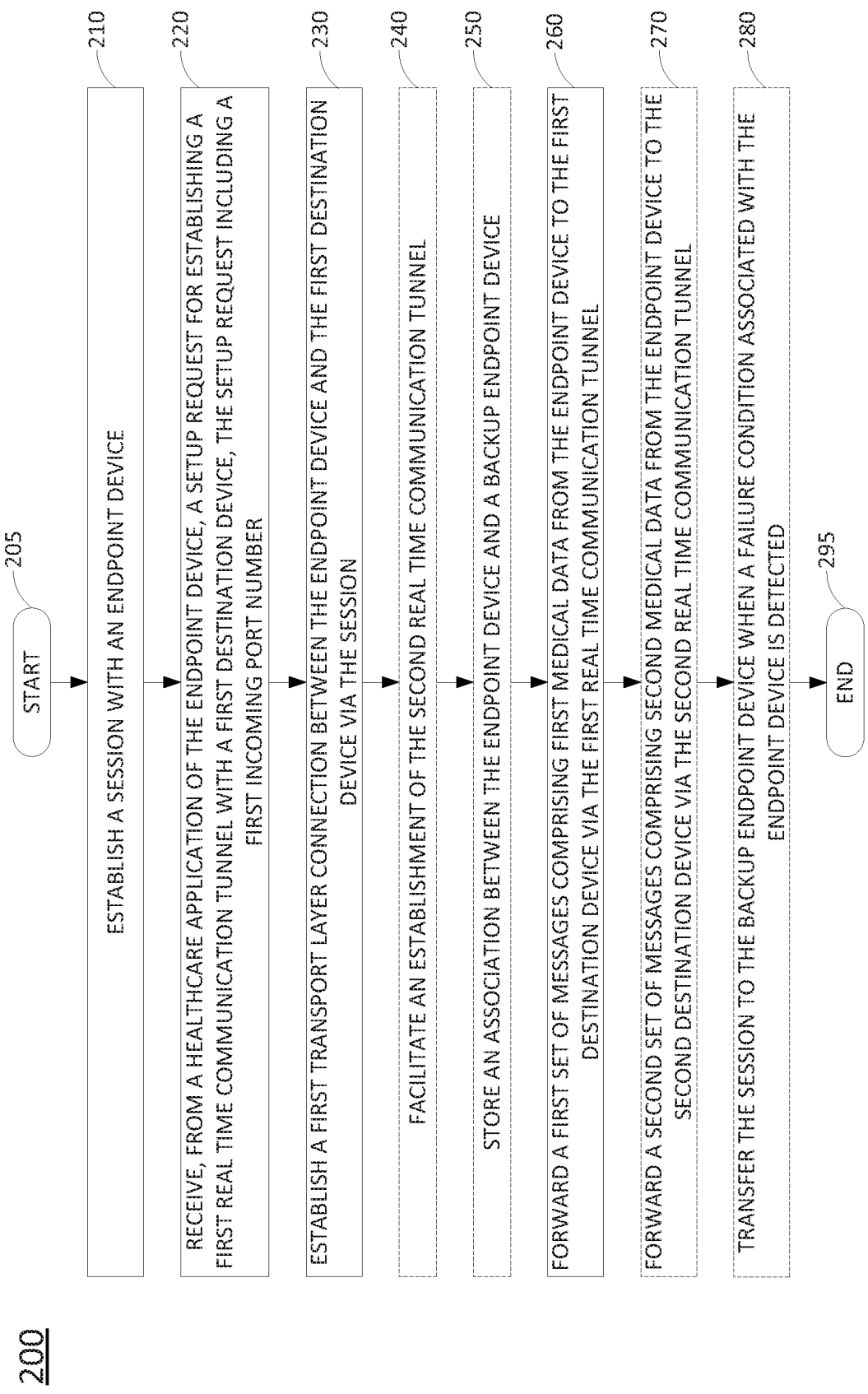
FIG. 2 illustrates a flowchart of an example method for establishing multiple real time communication tunnels of an endpoint device via a session with a gateway device.

FIG. 2 illustrates a flowchart of an example method 200 for establishing multiple real time communication tunnels of an endpoint device via a session with a gateway device, in accordance with the present disclosure. In one example, steps, functions and/or operations of the method 200 may be performed by a network-based device, e.g., a gateway device such as PDN gateway 138 or AS 145 in FIG. 1, or a gateway device in conjunction with other components of the system 100, a GGSN, and so forth. In one example, the steps, functions, or operations of method 200 may be performed by a computing device or system 300, and/or processor 302 as described in connection with FIG. 3 below. For example, the system 300 may represent a gateway device, in accordance with the present disclosure. For illustrative purposes, the method 200 is described in greater detail below in connection with an example performed by a processor, such as processor 302. The method begins in step 205 and proceeds to step 210.

At step 210, the processor establishes a session with an endpoint device. For example, step 210 may comprise establishing an EPS bearer or a PDP context. In one example, step 210 may include assigning an IP address to the endpoint device 161 for use in connection with communications with devices external to a cellular network which are reachable via the gateway device. In one example, the session may have bandwidth, delay, jitter, packet loss, and other parameters established in accordance with a quality of service (QoS) profile for healthcare-related traffic to be generated by and for healthcare applications on the endpoint device.

At step 220, the processor receives, from a healthcare application of the endpoint device, a setup request for establishing a first real time communication tunnel with a first destination device. For example, the setup request may comprise a SDP offer message directed to the first destination device. In one example, the healthcare application may comprise an aggregator application operating on the endpoint device for managing real time communication of healthcare-related data for other healthcare-related applications of the endpoint device. In one example, the first destination device is associated with a medical provider, e.g., a doctor, a hospital, an insurer, a healthcare-related mobile application provider, a healthcare-related data storage provider, and so forth. In one example, the setup request includes a first incoming port number.

At step 230, the processor establishes a first transport layer connection between the endpoint device and the first destination device via the session. In one example, the establishing the first transport layer connection includes translating the first incoming port number to a first outgoing port number according to a pre-assigned incoming port number-to-outgoing port number mapping and forwarding the setup request to the first destination device via the first outgoing port number. In one example, step 230 may further include receiving a response from the first destination device, e.g., a SDP response. In one example, the response may be received via the outgoing port number, and the processor may: translate the outgoing port number to the incoming port number in accordance with the incoming port number to outgoing port number mappings, modify the response by substituting the outgoing port number with the incoming port number, and forward the response that is modified to endpoint device.

In one example, the operations of step 230 may result in the establishment of a first transport layer connection between the endpoint device and the first destination device. For instance, a UDP connection may be established via the setup request and the response/answer. In one example, the gateway device of the processor remains in the path of the first transport layer connection. For instance, in one example, the gateway device may offer a service as a TURN server, or relay. In another example, the gateway device (and the processor) may remain in the path of the first transport layer connection by virtue of the gateway device anchoring the session with endpoint device and remaining the IP default gateway.

In one example, step 230 may also include exchanging messages between the endpoint device and first destination device for a DTLS handshake, where the processor may translate the incoming port number to the outgoing port number, and vice versa, for the DTLS handshake messages. Accordingly, the first real time communication tunnel (e.g., a DTLS tunnel, or WebRTC tunnel) may be established via the first transport layer connection. In addition, in one example, a second real time communication tunnel between the endpoint device and a second destination device may be established via the session in a similar manner. Following step 230, the method 200 may proceed to optional step 240, optional step 250, or to step 260.

At optional step 240, the processor may facilitate an establishment of the second real time communication tunnel. For example, the facilitating the establishment of the second real time communication tunnel may include receiving, from the healthcare application of the endpoint device, a second request for establishing the second real time communication tunnel with a second destination device. The second request may include a second incoming port number. In addition, the processor may establish a second transport layer connection between the endpoint device and the second destination device via the session. For instance, the establishing the second transport layer connection may include: translating the second incoming port number to a second outgoing port number according to the pre-assigned incoming port number-to-outgoing port number mapping and forwarding the second request to the second destination device via the second outgoing port number. Optional step 240 may further include receiving a response from the second destination device, e.g., a SDP response. In one example, the response may be received via the second outgoing port number, and the processor may: translate the second outgoing port number to the second incoming port number in accordance with the incoming port number to outgoing port number mappings, modify the response by substituting the second outgoing port number with the second incoming port number, and forward the response that is modified to endpoint device.

In one example, the operations of optional step 240 may result in the establishment of a second transport layer connection between the endpoint device and the second destination device (e.g., a UDP connection), where the gateway device (and the processor) remain within the path of the second transport layer connection. In one example, optional step 240 may further include exchanging messages between the endpoint device and the second destination device for a DTLS handshake, where the processor may translate the second incoming port number to the second outgoing port number, and vice versa, for the DTLS handshake messages. Thus, the second real time communication tunnel (e.g., a DTLS tunnel, or WebRTC tunnel) may be established between the endpoint device and the second destination device via the second transport layer connection. Following optional step 240, the method may proceed to optional step 250 or to step 260.

At optional step 250, the processor may store an association between the endpoint device and a backup endpoint device. For instance, in one example, the backup endpoint device may be registered with the processor as an authorized backup endpoint device for the session, as well as for the real time communication tunnel(s) established via the session.

At step 260, the processor forwards a first set of messages comprising first medical data (broadly, "healthcare-related data") from the endpoint device to the first destination device via the first real time communication tunnel. The first set of messages may comprise SRTP (and SRTCP) and/or SCTP messages. In one example, the payload of the first set of messages may be encrypted using keys exchanged via a DTLS handshake, e.g., as described above. In one example, the forwarding comprises translating the first incoming port number the first outgoing port number. For instance, the processor may remain in the path of the first real time communication tunnel and may continue to translate the incoming port number to the outgoing port number, and vice versa, for the first set of messages. Following step 260, the method 200 may proceed to optional step 270, optional step 280, or to step 295.

At optional step 270, the processor may forward a second set of messages comprising second medical data from the endpoint device to the second destination device via the second real time communication tunnel. For instance, optional step 260 may comprise similar operations to step 250, however, with a different incoming port number—outgoing port number pair, a different set of keys for encrypting the payload of the second set of messages, and so forth.

At optional step 280, the processor may transfer the session to the backup endpoint device when a failure condition associated with the endpoint device is detected. The failure condition may comprise a failure to receive a keep-alive message from the endpoint device, a message from the endpoint device predicting a loss of power, a failure of a user of the endpoint device to provide a user input after a certain duration of time, and so forth. In one example, the transferring of the session to the backup endpoint device comprises re-assigning an IP address that was assigned to the endpoint device for the session to the backup endpoint device. In one example, the endpoint device may provide redundancy data to the backup endpoint device to allow the backup endpoint device to maintain the first real time communication tunnel and the second real time communication tunnel. In one example, the redundancy data may be provided via a third real time communication tunnel between the endpoint device and the backup endpoint device via the session. In another example, the redundancy data may be provided via a peer-to-peer connection that excludes the gateway device and the processor. In one example, the redundancy data may include the security keys for the respective real time communication tunnels, e.g., keys obtained and/or provided by the endpoint device during a DLTS handshake for establishing each of the respective real time communication tunnels. The redundancy data may also include information on which port numbers to utilize in connection with different destination devices and/or different types of healthcare-related data as well as healthcare-related data that is transferred via various real time communication tunnels that are established via the session. Following optional step 280, the method may proceed to step 295. At step 295, the method 200 ends.

In addition, it should be noted that although not specifically specified, one or more steps, functions or operations of the method 200 may include a storing, displaying and/or outputting step as required for a particular application. In other words, any data, records, fields, and/or intermediate results discussed in the method 200 can be stored, displayed and/or outputted to another device as required for a particular application. Furthermore, steps or blocks in FIG. 2 that recite a determining operation or involve a decision do not necessarily require that both branches of the determining operation be practiced. In other words, one of the branches of the determining operation can be deemed as an optional step. In addition, one or more steps, blocks, functions, or operations of the above described method 200 may comprise optional steps, or can be combined, separated, and/or performed in a different order from that described above, without departing from the example embodiments of the present disclosure.

Figure 3:
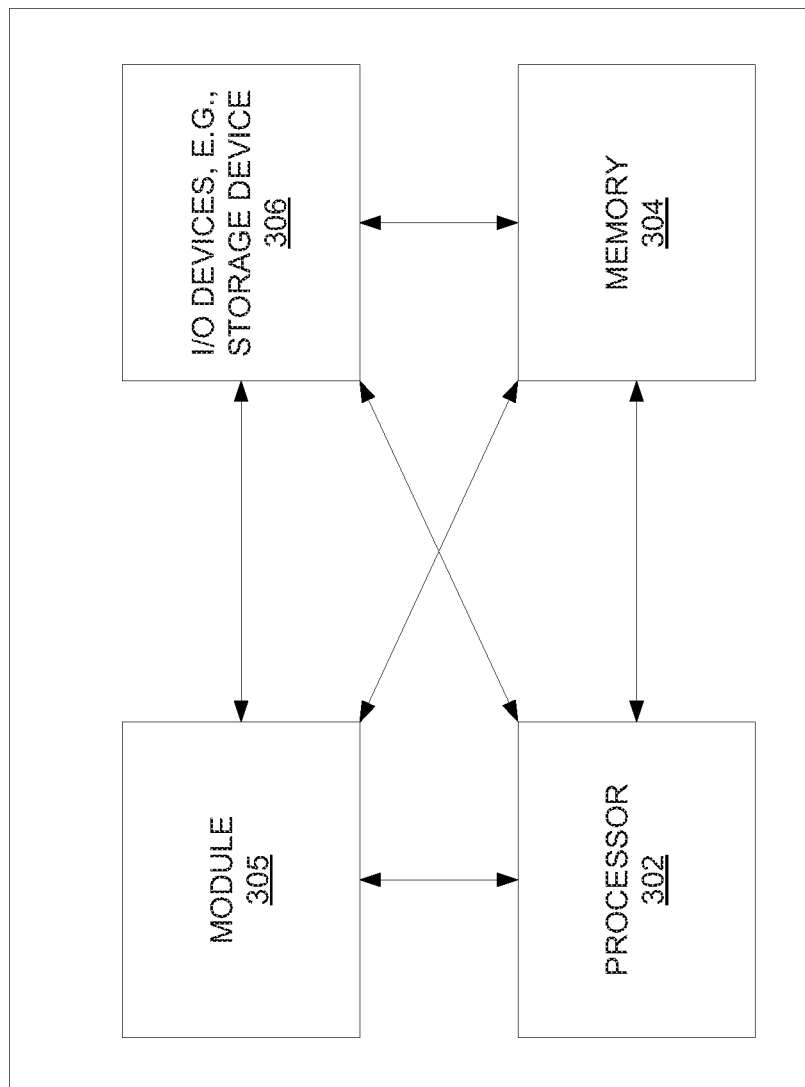
FIG. 3 illustrates an example high-level block diagram of a computer specifically programmed to perform the steps, functions, blocks, and/or operations described herein.

FIG. 3 depicts a high-level block diagram of a computing device suitable for use in performing the functions described herein. As depicted in FIG. 3, the system 300 comprises one or more hardware processor elements 302 (e.g., a central processing unit (CPU), a microprocessor, or a multi-core processor), a memory 304 (e.g., random access memory (RAM) and/or read only memory (ROM)), a module 305 for establishing multiple real time communication tunnels of an endpoint device via a session with a gateway device, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the above method 200, or the entire method 200 is implemented across multiple or parallel computing device, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one embodiment, instructions and data for the present module or process 305 for establishing multiple real time communication tunnels of an endpoint device via a session with a gateway device (e.g., a software program comprising computer-executable instructions) can be loaded into memory 304 and executed by hardware processor element 302 to implement the steps, functions or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for establishing multiple real time communication tunnels of an endpoint device via a session with a gateway device (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A gateway device, comprising:
   a processor; and
   a computer-readable medium storing instructions which, when executed by the processor, cause the processor to perform operations, the operations comprising:
   establishing a session between the gateway device and an endpoint device, wherein the session comprises a packet data protocol context or an evolved packet system bearer;
   receiving, from a healthcare application of the endpoint device, a setup request for establishing a first real time communication tunnel with a first destination device, wherein the setup request includes a first incoming port number, wherein the first destination device is associated with a medical provider;
   establishing a first transport layer connection between the endpoint device and the first destination device via the session between the gateway device and the endpoint device, wherein the establishing the first transport layer connection comprises:
   translating the first incoming port number to a first outgoing port number according to a pre-assigned incoming port number-to-outgoing port number mapping; and
   forwarding the setup request to the first destination device via the first outgoing port number, wherein the first real time communication tunnel is established between the endpoint device and the first destination device via the first transport layer connection, and wherein a second real time communication tunnel between the endpoint device and a second destination device is established via the session between the gateway device and the endpoint device; and
   forwarding a first set of messages comprising first medical data from the endpoint device to the first destination device via the first real time communication tunnel, wherein the forwarding comprises translating the first incoming port number to the first outgoing port number for the forwarding of the first set of messages.

2. The gateway device of claim 1, wherein the first transport layer connection comprises a user datagram protocol connection.

3. The gateway device of claim 1, wherein the first real time communication tunnel comprises a web real time communication tunnel.

4. The gateway device of claim 1, wherein the first real time communication tunnel comprises a datagram transport layer security tunnel, wherein keys exchanged via a datagram transport layer security handshake are applied to the first set of messages.

5. The gateway device of claim 1, wherein the first set of messages comprises at least one of:
   secure real time transport protocol messages;
   secure real time control transport protocol messages; or
   stream control transmission protocol messages.

6. The gateway device of claim 1, wherein the gateway device comprises a gateway general packet radio service support node or a packet data network gateway.

7. The gateway device of claim 1, wherein an internet protocol address is assigned to the endpoint device in connection with the establishing of the session.

8. The gateway device of claim 1, wherein the first destination device and the second destination device are deployed in at least one network that is external to a telecommunication network in which the gateway device is deployed.

9. The gateway device of claim 1, wherein the first incoming port number is selected by the endpoint device based upon a type of content of the first medical data, wherein the first incoming port number and the first outgoing port number are associated with the type of content.

10. The gateway device of claim 1, wherein the first incoming port number is selected by the endpoint device based upon a determination to send the first medical data to the first destination device, wherein the first incoming port number and first the outgoing port number are associated with the first destination device.

11. The gateway device of claim 1, wherein the operations further comprise:
    forwarding a second set of messages comprising second medical data from the endpoint device to the second destination device via the second real time communication tunnel.

12. The gateway device of claim 11, wherein the forwarding the second set of messages comprises translating a second incoming port number to a second outgoing port number in accordance with the pre-assigned incoming port number-to-outgoing port number mapping.

13. The gateway device of claim 1, wherein the operations further comprise:
    facilitating an establishment of the second real time communication tunnel, wherein the facilitating the establishment of the second real time communication tunnel comprises:
    receiving, from the healthcare application of the endpoint device, a second request for establishing the second real time communication tunnel with the second destination device, wherein the second request includes a second incoming port number; and
    establishing a second transport layer connection between the endpoint device and the second destination device via the session, wherein the establishing the second transport layer connection comprises;
    translating the second incoming port number to a second outgoing port number according to the pre-assigned incoming port number-to-outgoing port number mapping; and
    forwarding the second request to the second destination device via the second outgoing port number, wherein the second real time communication tunnel is established between the endpoint device and the second destination device via the second transport layer connection.

14. The gateway device of claim 1, wherein the operations further comprise:
    storing an association between the endpoint device and a backup endpoint device; and transferring the session to the backup endpoint device when a failure condition associated with the endpoint device is detected.

15. The gateway device of claim 14, wherein the endpoint device provides the backup endpoint device with redundancy data for maintaining the first real time communication tunnel and the second real time communication tunnel.

16. The gateway device of claim 15, wherein the endpoint device provides the backup endpoint device with the redundancy data for maintaining the first real time communication tunnel and the second real time communication tunnel via a third real time communication tunnel between the endpoint device and the backup endpoint device via the session.

17. The gateway device of claim 15, wherein the endpoint device provides the backup endpoint device with the redundancy data for maintaining the first real time communication tunnel and the second real time communication tunnel via a peer-to-peer connection that excludes the gateway device.

18. A non-transitory computer-readable medium storing instructions which, when executed by a processor of a gateway device, cause the processor to perform operations, the operations comprising:
   establishing a session between the gateway device and an endpoint device, wherein the session comprises a packet data protocol context or an evolved packet system bearer;
   receiving, from a healthcare application of the endpoint device, a setup request for establishing a first real time communication tunnel with a first destination device, wherein the setup request includes a first incoming port number, wherein the first destination device is associated with a medical provider;
   establishing a first transport layer connection between the endpoint device and the first destination device via the session between the gateway device and the endpoint device, wherein the establishing the first transport layer connection comprises:
      translating the first incoming port number to a first outgoing port number according to a pre-assigned incoming port number-to-outgoing port number mapping; and
      forwarding the setup request to the first destination device via the first outgoing port number, wherein the first real time communication tunnel is established between the endpoint device and the first destination device via the first transport layer connection, and wherein a second real time communication tunnel between the endpoint device and a second destination device is established via the session between the gateway device and the endpoint device; and
   forwarding a first set of messages comprising first medical data from the endpoint device to the first destination device via the first real time communication tunnel, wherein the forwarding comprises translating the first incoming port number to the first outgoing port number for the forwarding of the first set of messages.

19. A method comprising:
   establishing, by a processor of a gateway device, a session between the gateway device and an endpoint device, wherein the session comprises a packet data protocol context or an evolved packet system bearer;
   receiving, by the processor from a healthcare application of the endpoint device, a setup request for establishing a first real time communication tunnel with a first destination device, wherein the setup request includes a first incoming port number, wherein the first destination device is associated with a medical provider;
   establishing, by the processor, a first transport layer connection between the endpoint device and the first destination device via the session between the gateway device and the endpoint device, wherein the establishing the first transport layer connection comprises:
      translating, by the processor, the first incoming port number to a first outgoing port number according to a pre-assigned incoming port number-to-outgoing port number mapping; and
      forwarding, by the processor, the setup request to the first destination device via the first outgoing port number, wherein the first real time communication tunnel is established between the endpoint device and the first destination device via the first transport layer connection, and wherein a second real time communication tunnel between the endpoint device and a second destination device is established via the session between the gateway device and the endpoint device; and
   forwarding, by the processor, a first set of messages comprising first medical data from the endpoint device to the first destination device via the first real time communication tunnel, wherein the forwarding comprises translating the first incoming port number to the first outgoing port number for the forwarding of the first set of messages.

20. The method of claim 19, wherein an internet protocol address is assigned to the endpoint device in connection with the establishing of the session.

* * * * *